Aug. 23, 1966   G. WHITEHURST   3,267,921
FUEL INJECTION FOR INTERNAL COMBUSTION ENGINES
Filed Dec. 23, 1964   2 Sheets-Sheet 1

INVENTOR
GEORGE WHITEHURST

United States Patent Office 3,267,921
Patented August 23, 1966

3,267,921
FUEL INJECTION FOR INTERNAL
COMBUSTION ENGINES
George Whitehurst, 37 Merton Road, Harrow, England
Filed Dec. 23, 1964, Ser. No. 420,533
5 Claims. (Cl. 123—139)

This invention relates to an arrangement for injecting fuel into the cylinders of internal combustion engines, and is a continuation-in-part of my patent application Serial No. 71,322 (now abandoned).

A problem which exists with air manifold petrol injection type internal combustion engines is the difficulty of obtaining an adequate mixture of petrol and air to give optimum combustion of the mixture in the engine cylinders. It is well known that multi-cylinder engines taking a mixture of air and fuel from an inlet manifold suffer from a lack of equal fuel distribution. One of the main causes of this disadvantage is the presence of air-flow reversals in the manifold the effect of which is that some cylinders receive more fuel than the optimum amount, while others are correspondingly starved of fuel. I have found that this effect of the air-flow reversals is particularly pronounced where the fuel is injected continuously or as a dribble-feed.

It is an object of the present invention to overcome this disadvantage and to provide an arrangement in which each cylinder of a multi-cylinder engine will receive its optimum amount of fuel so that the engine performance is improved and the engine economy is improved for the same power output, the latter being of importance due to the rising cost of fuel mainly due to Government taxes.

It is a further object of the present invention to provide a particularly simple arrangement for injecting fuel into the cylinders of internal combustion engines.

These and other objects of the invention are accomplished by providing, in accordance with the invention in an internal combustion engine including a plurality of cylinders, an engine crankshaft, a fuel intake manifold serving said cylinders, and means to direct air for combustion in a stream into said manifold, an arrangement for injecting fuel into said manifold comprising a fuel pump, a drive shaft to said pump, means operatively connecting said pump drive shaft with the engine crankshaft and arranged to drive said pump drive shaft at a speed having a fixed ratio to the engine speed, said pump being capable of supplying metered quantities of fuel in very short periods of time in relation to the arc of crankshaft rotation and arranged to provide an injection for each engine cylinder cycle, a nozzle mounted on said manifold, and conduit means interconnecting said pump and said nozzle, the nozzle being arranged to receive slugs of fuel from said pump and to direct a spray of fuel directly into said manifold under pressure into a stream of combustion air at a location to effect adequate mixing of air and fuel for supplying the cylinders served by said manifold.

The pump employed in the fuel injection arrangement of the present invention is one which is capable of supplying metered quantities of fuel at a predetermined rate and at predetermined intervals of time, and which is capable of injecting the fuel in a very short period of time, in relation to the arc of crankshaft rotation, e.g. a period of about 5° to about 10° of pump drive shaft movement. The pump is preferably of the kind in which a pumping chamber is formed by a deformable resilient member arranged between two rigid members, one of which is reciprocable with respect to the other, so that the volume of the pumping chamber is varied as the movable rigid member is reciprocated, and in which the pump is provided with an inlet valve device the operation of which is effected by the reciprocating motion of the movable rigid member, means being provided for varying at will the instant of operation of the valve device in relation to the reciprocation of the movable rigid member. The pump is preferably one such as is described in Patent No. 2,745,349 to Bruno Tavola.

It will be noted that no distributor is present between the pump and the nozzle and it is surprising that the arrangement operates so satisfactorily, because it had previously been proposed to use the pump of Patent No. 2,745,349 as a metering pump for metering fuel before feeding it to a rotary distributor which fed the fuel to injectors for introducing the fuel into the cylinders. (See "Design News" for October 27, 1958, pages 30 and 31.)

The elimination of the distributor and the use of the pump as an intermittent metering feed pump are features which could not be predicated from the prior art, and I have found that by eliminating the distributor it is possible to inject the fuel at points in the engine cycle when the disturbing airflow reversals are not present, and since the fuel is injected in such a short space of time it will be fed into the appropriate cylinder and fully scavenged from the air manifold before the next injection, so that each cylinder receives its optimum fuel requirement.

In order to enable the invention to be more readily understood, reference will now be made to the accompanying drawings, which illustrate diagrammatically and by way of example two embodiments thereof, and in which.

Figure 1:
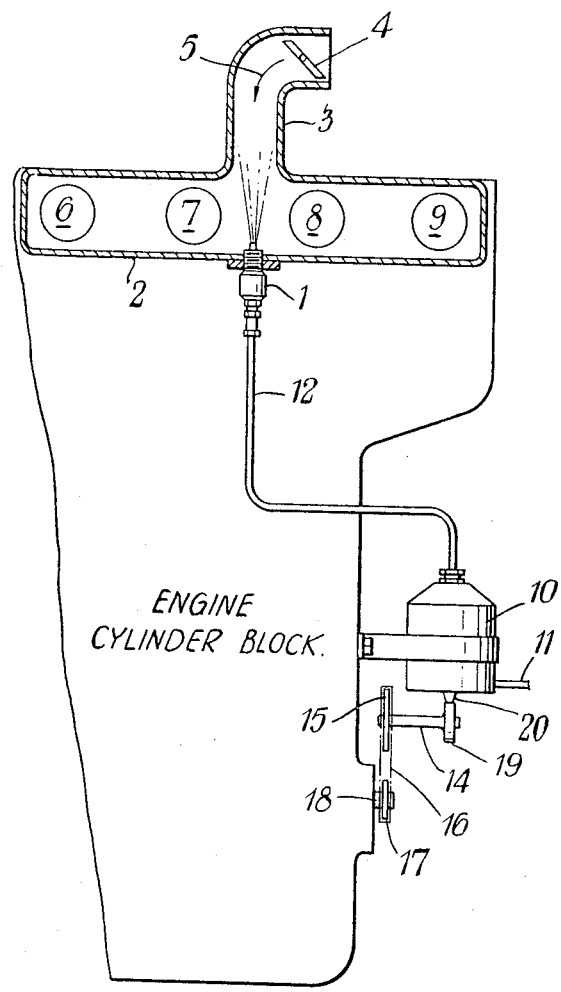
FIGURE 1 is a part sectional view of a fuel injection system.

Referring now to FIGURE 1, there is shown a four cylinder internal combustion engine incorporating a fuel injection system, parts of the engine not required for an explanation of the invention not being shown so as not to overload the drawing with irrelevant detail. The fuel injection system comprises an injector nozzle 1 screwed into the bottom of an air manifold 2. A conduit 3 leading into the manifold 2, is provided with the usual throttle plate 4 which is operable in a manner known per se and need not be detailed here. The nozzle 1 is located so as to direct a spray of fuel into said pipe 3 against the direction of air flow through the pipe 3 as indicated by the arrow 5. The air manifold 2 has connections 6, 7, 8 and 9 to the four cylinders of the engine.

Mounted adjacent the lower part of the cylinder block of the engine is a fuel pump 10 having a fuel inlet 11. The pump 10 is a reciprocating pump such as that described in the aforesaid Tavola Patent No. 2,745,349 to which reference may be made for a fuller description of the pump, and the disclosure of which is incorporated herein by reference. The pump 10 is arranged to pump fuel from the fuel inlet 11 through a conduit 12 to the injector nozzle 1. The pump 10 has a pump drive shaft 14 on which is fixedly mounted a sprocket wheel 15. The sprocket wheel 15 is driven through a chain 16 running around another sprocket wheel 17 fixedly mounted on one end of the engine crankshaft 18. The sprocket wheels 15 and 17 are so chosen that the pump drive shaft 14 rotates at half the speed of the crankshaft 18, i.e. the pump drive shaft rotates at half engine speed.

The pump drive shaft 14 carries a four-lobed cam 19 engaging against the lower portion of a rigid movable pump member 20 which serves for varying the pumping chamber of the Tavola pump 10 as described above, the cam 19 and member 20 corresponding to the cam 29 and member 14 shown in the drawings of the aforesaid Tavola Patent No. 2,745,349. Since the pump drive shaft rotates at half engine speed and since there are four lobes in the cam 19, two injections will occur for each revolution of the engine crankshaft 18 and therefore an injection will occur for each engine cylinder cycle. The pump 10 is advantageously set for feeding slugs of fuel in a very short period of time, which is about 5° to about 10° of pump drive shaft movement, to the nozzle 1 where they are injected into the air manifold without any dribbling.

Figure 2:
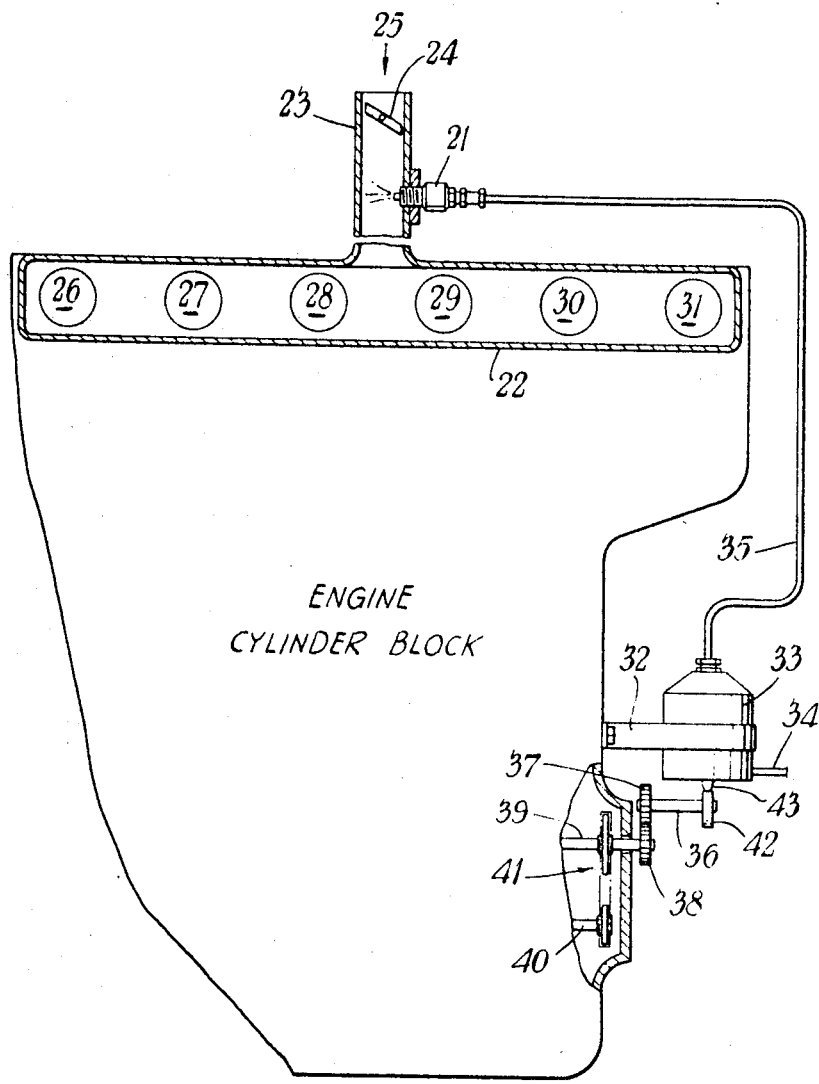
FIGURE 2 is a part sectional view of a modification of the injection system shown in FIGURE 1.

Referring now to FIGURE 2, there is shown a six-cylinder internal combustion engine incorporating a fuel injection system, parts of the engine not required for an explanation of the invention again not being shown so as not to overload the drawing with irrelevant detail. The fuel injection system comprises an injector nozzle 21 screwed into the bottom of an air manifold 22 having an inlet conduit 23 extending substantially at right angles to the longitudinal axis of the manifold 22, the nozzle 21 being located so as to direct a spray of fuel into the conduit 23 across the direction of flow of air therein as indicated by the arrow 25.

With the system shown in FIGURE 2, better fuel economy can be obtained in the part throttle range, as the air stream deflects the spray from the air inlet pipe into the air manifold 22 before the spray impinges on the wall of the air inlet pipe opposite to the nozzle 21. The conduit 23 is provided with the usual throttle plate 24 which is also operable in a manner know per se. The air manifold 22 has connections 26, 27, 28, 29, 30 and 31 to the six cylinders of the engine.

Mounted adjacent the lower part of the cylinder block of the engine by a bracket 32, is a fuel pump 33 having a fuel inlet 34. The pump 33, like the pump 10 of FIGURE 1, is the Tavola pump aforesaid, and is arranged to pump slugs of fuel from the fuel inlet 34 through a conduit 35 to the injector nozzle 21.

The pump 34 has a drive shaft 36 on which is fixedly mounted a gearwheel 37, meshing with a gearwheel 38 fixedly mounted on the cam shaft 39 of the engine. As shown, the cam shaft 39 is driven from the engine crankshaft 40 in conventional manner through a chain and sprocket drive 41 providing a 2:1 reduction, while the gearwheels 37 and 38 have a 1:1 gear ratio, so that the pump drive shaft 36 rotates at half engine speed. It will be readily appreciated that alternatively the pump drive shaft 36 may be directly coupled to the cam shaft 39 with the omission of the gearwheels 37 and 38.

The pump drive shaft 36 carries a six-lobed cam 42 engaging against the lower portion of a rigid movable pump member 43 as described with reference to FIGURE 1. Since the pump drive shaft rotates at half engine speed and since there are six lobes in the cam 42, three injections will occur for each revolution of the engine crankshaft 40 and therefore an injection will occur for each cylinder cycle.

From the foregoing, it is apparent that the pump drive shaft speed and the number of lobes in the cam 19 or 42 are so chosen in relation to the number of cylinders that one injection of fuel occurs for each cylinder cycle. Thus, if a single-lobed cam were used for the pump, then with the arrangement shown in FIGURE 1, the pump drive shaft 14 would have to rotate at twice the engine crankshaft speed which could be arranged by reversing the positions of the sprockets 15 and 17, while for the arrangement shown in FIGURE 2, the pump drive shaft would have to rotate at three times the engine crankshaft speed which could be arranged by appropriate choice of the ratio of the gearwheels 37 and 38. The relationship between the speed of the pump drive shaft for a four stroke cycle engine, the number of lobes on the cam 19 or 42 and the number of cylinders may be expressed as:

$$\frac{\text{pump drive shaft speed}}{\text{engine crankshaft speed}} = \frac{\text{No. of cylinders}}{2} \times \frac{1}{\text{No. of lobes on the cam}}$$

Thus if the number of cylinders is known, and the number of lobes on the cam is chosen, the relationship between the speed of the pump drive shaft in relation to that of the engine crankshaft cam can be readily determined and can be readily adjusted by appropriate choice of gear ratios between the crankshaft and the pump drive shaft, possibly via the engine cam shaft.

In each of the embodiments discussed above, the timing of the cylinder inlet valves of the engine is effected by the engine cam shaft in a manner which is well understood to those skilled in the art and need not be further detailed, and the timing of the pump in relation to the timing of the cylinder inlet valves will usually be effected by adjustment of the pump in the manner described in the aforesaid Tavola Patent No. 2,745,349. In general, the exact point of time at which an injection occurs in relation to the opening of a respective cylinder inlet valve may depend on the breathing characteristics of the engine and the necessity for avoiding air-flow reversals in the manifold, so that the optimum timing of the pump in relation to the timing of the cylinder inlet valves may have to be determined experimentally for any particular engine. In certain cases it may be desirable to inject the fuel somewhat in advance of the opening of the respective cylinder inlet valve rather than when the valve is opened to ensure that the fuel is properly carried into the cylinder. However, since the pump is advantageously set to inject the fuel into the manifold within 5° to 10° of pump drive shaft movement and makes one injection for each engine cylinder cycle there is a wide range of time within which the optimum time for injection may occur.

The amount of fuel which is injected into the air stream may be controlled in accordance with variations in the air flow in the manifold by means of a diaphragm unit connected to the manifold and operable by manifold depression to control the pump in conjunction with speed sensitive means operated, for example, by a fly weight regulator driven by the engine. For example, in a device of this nature, as indicated in applicant's Patent No. 3,078,833.

In the operation of each of the embodiments just described, the pump 10 or 33 feeds slugs of fuel to the injector nozzle where they are injected without any dribbling. As each slug of fuel is fed into the air manifold it encounters a stream of air which carries it away to the appropriate cylinder and which completely scavenges the fuel so that each injection or slug is fully scavenged from the air manifold before the injection of a further slug. This has the important advantage of evening out the distribution of the fuel to the cylinders and gives greater fuel economy at the same power or improved power output for the same fuel input.

The scavenging of the fuel from the manifold 2 is accomplished with the inventive device because the pump 10 is set to discharge fuel into the manifold only during a short portion of the entire intake stroke for the piston in the cylinder which is being supplied with fuel. A pump of the nature shown in the Tavola Patent No. 2,745,349 may be set to operate to discharge the fuel into the manifold 2 only during the most advantageous portion of the fuel intake stroke for the affected cylinder. The discharge of the pump will be closed before the next cylinder is ready for its intake stroke so that the manifold will be completely scavenged of fuel by the continuing in rush of air to the affected cylinder before the intake valve for the next cylinder is opened.

In contradistinction, in a fuel injection system where the fuel is fed continuously into the air manifold but at a variable rate the fuel will tend to stick to the sides of the manifold where it is introduced and will not be fully scavenged. This means that some cylinders will not get sufficient fuel to operate at optimum efficiency. Furthermore, the film of fuel on the wall of the air manifold may build up to form a large drop which may then be detached by the air stream so that another particular cylinder may receive too much fuel for optimum efficiency. With the instant invention these defects are avoided by injecting the fuel in a very short period of time as a slug which is fully scavenged from the air manifold before the next slug is injected so that the disadvantages mentioned above cannot occur.

For example, consider the case where a 6-cylinder engine is intended to operate with a fuel supply of 30 cubic millimetres of fuel for each cylinder. Then, in the case where the fuel is introduced continuously and may build up on the walls as indicated above the cylinders may in turn receive at any one time the following amounts of fuel:

| Cylinder | Amount of fuel/mm.³ |
|---|---|
| 1 | 29 |
| 2 | 30 |
| 3 | 28 |
| 4 | 34 |
| 5 | 28 |
| 6 | 31 |

Now cylinders, 1, 2 and 6 are, to all intents and purposes, operating at optimum efficiency with the possible exception of cylinder 1. Cylinders 3 and 5 are not operating at optimum efficiency due to the lack of fuel and will thus cause a loss of power. Likewise, cylinder 4 which receives an excess of fuel does not operate at optimum efficiency and also causes a loss of power. When the fuel injection system of the present invention is employed for these same six cylinders, then the 30 cubic millimetre slugs are injected and fully scavenged before the injection of a subsequent slug so that each cylinder will receive its requisite 30 cubic millimetres of fuel. Thus each cylinder will be operating at optimum efficiency using the same amount of fuel as previously so that there will be an increase in power and this is brought about by the even distribution of fuel and the improved fuel to air ratio.

What I claim is:
1. A combustion engine fuel system for an internal combustion engine having a plurality of operating cylinders comprising wall means defining a manifold connecting each of the engine cylinders and having an air inlet, a liquid fuel spray nozzle mounted on said manifold and arranged to direct a spray of liquid fuel into the stream of air coming in through said inlet of said manifold, and a positive displacement pump connected to said engine and operated thereby and having a discharge connected directly to said fuel spray nozzle, said pump being set to discharge at distinct and separate times needed quantities of fuel for each cylinder only during the respective intake portions of the cycles of operation of each affected engine cylinder and only over very short periods of the engine cycle time during which the affected cylinder is receiving fuel and air from said manifold.

2. A combustion engine fuel system for an internal combustion engine having a plurality of operating cylinders comprising wall means defining a manifold connecting each of the engine cylinders and having an air inlet, a liquid fuel spray nozzle mounted on said manifold and arranged to direct a spray of liquid fuel into the stream of air coming in through said inlet of said manifold, said engine including a crank shaft, a positive displacement pump connected to said engine and operated thereby and having a discharge connected directly to said fuel spray nozzle, said pump being set to discharge needed quantities of fuel only during the respective intake portions of the cycles of operation of each affected engine cylinder and only over very short periods of the engine cycle time during which the affected cylinder is receiving fuel and air from said manifold, a pump drive shaft operatively driving said pump, and drive means connected between said pump drive shaft and said crank shaft.

3. A combustion engine fuel system for an internal combustion engine having a plurality of operating cylinders comprising wall means defining a manifold connecting each of the engine cylinders and having an air inlet, a liquid fuel spray nozzle mounted on said manifold and arranged to direct a spray of liquid fuel into the stream of air coming in through said inlet of said manifold, said engine including a crank shaft, a positive displacement pump connected to said engine and operated thereby and having a discharge connected directly to said fuel spray nozzle, said pump being set to discharge needed quantities of fuel only during the respective intake portions of the cycles of operation of each affected engine cylinder and only over very short periods of the engine cycle time during which the affected cylinder is receiving fuel and air from said manifold, a pump drive shaft operatively driving said pump, and drive means connected between said pump drive shaft and said crank shaft, said pump discharging fuel to said spray nozzle within a period of about from 5 to 10° of pump drive shaft movement during operation for each cylinder.

4. The improvement of claim 3, wherein said drive means operatively connecting said pump drive shaft with the engine crankshaft comprises sprocket wheel and chain means arranged to give a 2:1 reduction whereby the pump drive shaft is driven at half engine speed.

5. The improvement of claim 3, wherein said drive means includes an engine cam shaft driven by said engine crankshaft, gear means interconnecting said cam shaft and said pump drive shaft arranged to give a 1:1 ratio interconnecting the pump drive shaft and the engine cam shaft whereby the pump drive shaft is driven at the cam shaft speed which is half engine speed.

References Cited by the Examiner

UNITED STATES PATENTS

| | | | |
|---|---|---|---|
| 1,445,100 | 2/1923 | Nelson | 123—139.17 |
| 1,903,433 | 4/1933 | Bjering | 123—139.17 |
| 2,165,447 | 7/1939 | Browne | 123—119 |
| 2,341,257 | 2/1944 | Wunsch | 123—119 |
| 2,430,264 | 2/1947 | Wiegand et al. | 123—139.17 |
| 2,706,976 | 4/1955 | Gianini | 123—139.17 |
| 2,745,349 | 5/1956 | Tavola | 103—37 |
| 2,803,233 | 8/1957 | Demtshenko | 123—139.17 |
| 2,892,453 | 6/1959 | Stoll | 123—139.17 |
| 2,937,636 | 5/1960 | Aldinger et al. | 123—139.17 |

MARK NEWMAN, *Primary Examiner.*

LAURENCE M. GOODRIDGE, *Examiner.*